(12) United States Patent
Fujisawa et al.

(10) Patent No.: US 12,183,164 B2
(45) Date of Patent: Dec. 31, 2024

(54) INFORMATION PROCESSING DEVICE, INFORMATION PROCESSING METHOD, AND INFORMATION PROCESSING SYSTEM

(71) Applicant: mixi, Inc., Tokyo (JP)

(72) Inventors: Jin Fujisawa, Tokyo (JP); Takayuki Magata, Tokyo (JP)

(73) Assignee: MIXI, INC., Tokyo (JP)

( * ) Notice: Subject to any disclaimer, the term of this patent is extended or adjusted under 35 U.S.C. 154(b) by 285 days.

(21) Appl. No.: 17/763,316

(22) PCT Filed: Apr. 27, 2021

(86) PCT No.: PCT/JP2021/016824
§ 371 (c)(1),
(2) Date: Mar. 24, 2022

(87) PCT Pub. No.: WO2021/235203
PCT Pub. Date: Nov. 25, 2021

(65) Prior Publication Data
US 2022/0366765 A1    Nov. 17, 2022

(30) Foreign Application Priority Data

May 18, 2020    (JP) .................................. 2020-086602

(51) Int. Cl.
*G07F 17/32*    (2006.01)
(52) U.S. Cl.
CPC ...... *G07F 17/3288* (2013.01); *G07F 17/3237* (2013.01); *G07F 17/3244* (2013.01)
(58) Field of Classification Search
CPC ............. G07F 17/3288; G07F 17/3237; G07F 17/3244
See application file for complete search history.

(56) References Cited

U.S. PATENT DOCUMENTS

| | | | | |
|---|---|---|---|---|
| 8,671,019 B1* | 3/2014 | Barclay | .............. | G06Q 30/0241 |
| | | | | 705/14.1 |
| 2007/0129126 A1* | 6/2007 | Van Luchene | ......... | G06Q 30/04 |
| | | | | 463/1 |
| 2013/0005439 A1* | 1/2013 | Okujo | ..................... | G07F 17/32 |
| | | | | 463/25 |

(Continued)

FOREIGN PATENT DOCUMENTS

| | | |
|---|---|---|
| JP | 2007-61472 A | 3/2007 |
| JP | 2010-117947 A | 5/2010 |

(Continued)

OTHER PUBLICATIONS

PCT/ISA/210 International Search Report with English translation of PCT/JP2021/016824, 5 pages.

*Primary Examiner* — Werner G Garner
(74) *Attorney, Agent, or Firm* — Muncy, Geissler, Olds & Lowe, P.C.

(57) ABSTRACT

Provided are an information processing apparatus, an information processing method, and a program capable of arousing play motivation for a game and betting motivation on a result of a competition.

An information processing apparatus of the present invention includes a value providing unit that provides first value to a user who has performed betting on a result of a competition; and a benefit providing unit that provides a benefit usable in a game to the user by consuming the first value.

14 Claims, 16 Drawing Sheets

(56) References Cited

U.S. PATENT DOCUMENTS

2017/0186272 A1* 6/2017 Schwartz ............ G07F 17/3227
2022/0157124 A1* 5/2022 Yoneda ............... G07F 17/3267

FOREIGN PATENT DOCUMENTS

| JP | 2013-230314 A | 11/2013 | | |
|----|---------------|---------|----|----|
| JP | 2016-47215 A | 4/2016 | | |
| JP | 2017-111511 A | 6/2017 | | |
| JP | 6690760 | 4/2020 | | |
| WO | WO-2020194479 A1 * | 10/2020 | ......... | G07F 17/3213 |

* cited by examiner

FIG. 5

| USER INFORMATION | | | | | | | | |
|---|---|---|---|---|---|---|---|---|
| ID | PERSONAL INFORMATION | TYPE OF TERMINAL | PAYMENT HISTORY | BETTING HISTORY | NUMBER OF POSSESSED POINTS | NUMBER OF POSSESSED BENEFITS | GAME INFORMATION | ... |
| ... | ... | ... | ... | ... | ... | ... | ... | ... |

FIG. 6

| POINT INFORMATION | | | |
|---|---|---|---|
| ID | BETTING RESULT | PROVIDED AMOUNT | ... |
| ... | ... | ... | ... |

FIG. 7

| BENEFIT INFORMATION | | |
|---|---|---|
| ID | CONVERSION RATE | ... |
| ... | ... | ... |

FIG. 9

| USER INFORMATION | | | | | | | | | |
|---|---|---|---|---|---|---|---|---|---|
| ID | PERSONAL INFORMATION | TYPE OF TERMINAL | LOG-IN HISTORY | PAYMENT HISTORY | BETTING HISTORY | NUMBER OF POSSESSED POINTS | NUMBER OF POSSESSED BENEFITS | STATUS | ... |
| ... | ... | ... | ... | ... | ... | ... | ... | ... | ... |

FIG. 10

| GAME PROGRESS DATA | | | | |
|---|---|---|---|---|
| ID | CHARACTER | ITEM | QUEST | ... |
| ... | ... | ... | ... | ... |

INFORMATION PROCESSING DEVICE, INFORMATION PROCESSING METHOD, AND INFORMATION PROCESSING SYSTEM

TECHNICAL FIELD

The present invention relates to an information processing apparatus, an information processing method, and a program.

BACKGROUND ART

Conventionally, there has been known a system that provides a point to a bettor who predicted a result of a competition such as a horse race, a boat race, a bicycle race, or an auto race and made a bet, when the prediction is wrong.

For example, Patent Literature 1 discloses a point providing device that calculates a degree of closeness of a wrong prediction in a case where a prediction is wrong and provides a point according to the degree of closeness to the bettor.

CITATION LIST

Patent Literature

Patent Literature 1: JP 2010-117947 A

SUMMARY OF INVENTION

Technical Problems

In a situation where a network communication service allowing playing and enjoying a game separately from a competition is provided, it is required to arouse both play motivation of a bettor for a game and betting motivation of a game user on a result of a competition through provision of points.

Therefore, an object of one aspect of the present invention is to provide an information processing apparatus, an information processing method, and a program capable of arousing play motivation for a game and betting motivation on a result of a competition.

Solution to Problems

An information processing apparatus according to one aspect of the present invention includes a value providing unit that provides first value to a user who has made a bet on a result of a competition; and a benefit providing unit that consumes the first value and provides a benefit usable in a game different from the competition to the user.

Advantageous Effects of Invention

According to one aspect of the present invention, first value is provided to a user as an additional value of betting on a result of a competition, and a benefit usable in a game is provided by consuming the provided first value. As a result, it is possible to arouse the play motivation for a game and the betting motivation on a result of a competition.

BRIEF DESCRIPTION OF DRAWINGS

FIG. 5 is a diagram illustrating an example of user information data.

FIG. 6 is a diagram illustrating an example of point information data.

FIG. 7 is a diagram illustrating an example of benefit information data.

FIG. 9 is a diagram illustrating an example of user information data.

FIG. 10 is a diagram illustrating an example of game progress data.

DESCRIPTION OF EMBODIMENTS

Hereinafter, an information processing apparatus, an information processing method, and a program according to the present invention will be described in detail with reference to preferred embodiments illustrated in the accompanying drawings.

Note that the embodiments described below are merely examples given to facilitate understanding of the present invention, and do not limit the present invention. That is, the present invention can be changed or improved from the embodiments described below without departing from the gist of the invention. In addition, the present invention includes equivalents thereof as well.

<Outline of Point Management System S>

Figure 1:
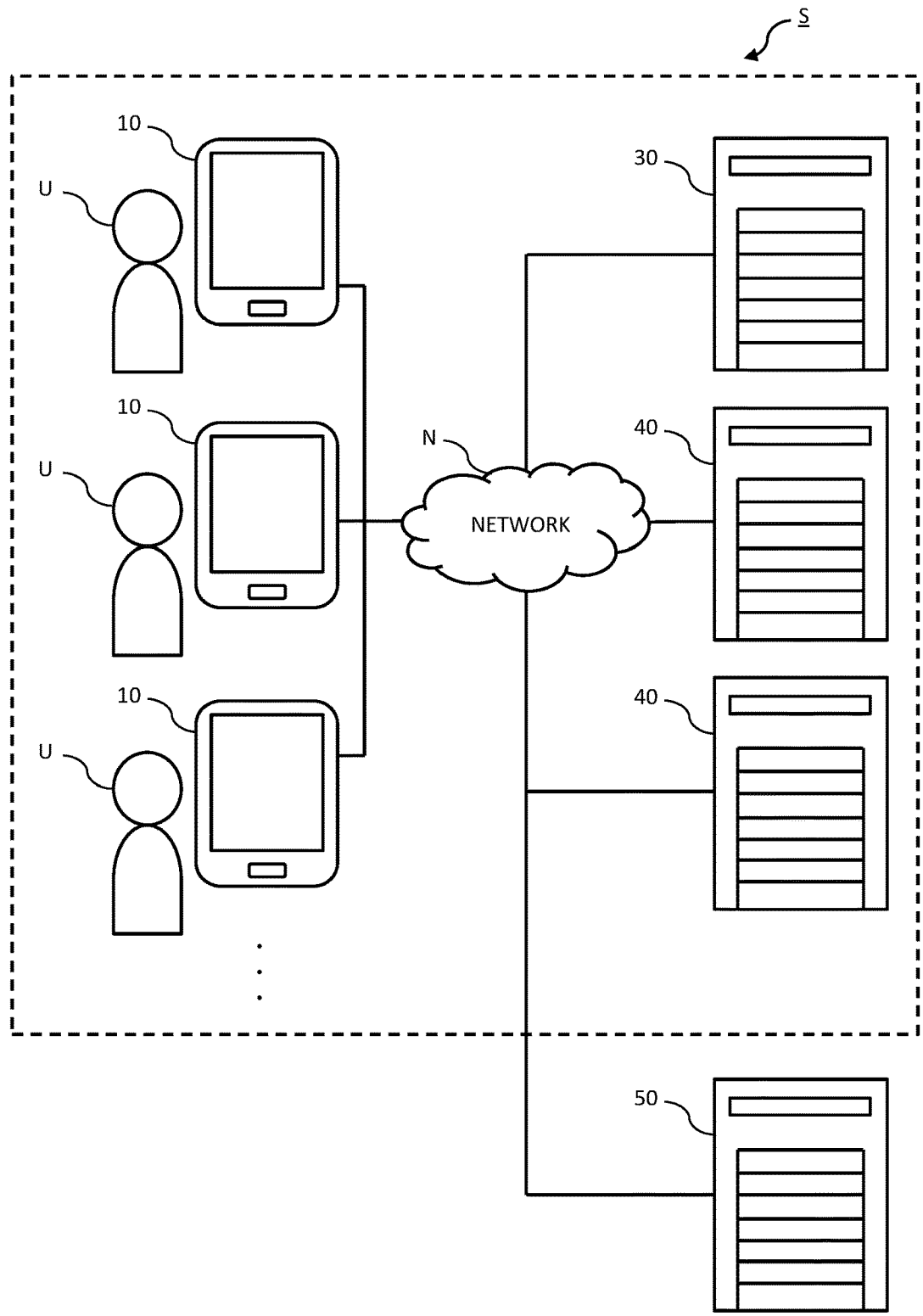
FIG. 1 is a conceptual diagram of a point management system including an information processing apparatus according to an embodiment of the present invention.

A communication system (hereinafter, referred to as a point management system S) illustrated in FIG. 1 is an information processing apparatus according to an embodiment of the present invention, that is, a communication system including a point management server 30 and a game management server 40. The point management system S provides a point and a benefit that can be obtained by consuming the point and is usable in a game to a user U who predicted and made a bet on a result of a competition.

The competition is different from a game to be described later, and a player competes for superiority or inferiority of a technique, ability, or the like according to a certain rule. For example, the competition includes a public competition that is actually held as a gambling by a public institution, such as a horse race, a boat race, a bicycle race, or an auto race. The user U can bet on a result of a competition by predicting the result of the competition (result of the order of arrival of a competition object, for example) based on competition information and purchasing a betting ticket for a horse, a boat, a motorcycle, a motorcar, or the like using the third value usable in betting. In a case where the bet based on the prediction of the user U is won, the user U can obtain a payout (a return to the correct bet) calculated based on the amount of the third value put on the bet and the odds, and the amount of the third value possessed increases. On the other hand, in a case where the bet based on the prediction of the user U is lost, the user U loses the third value of the amount put on the bet, and the amount of the third value possessed decreases. Note that, the third value may be any medium that can be used for betting, and includes, for example, a value such as currency (money) or a dedicated token.

Hereinafter, in the present embodiment, as an example of a competition, a public competition will be assumed and described. However, the content of the competition is not limited to the public competition, and a prediction may be made on a result of winning/losing of sports such as track and field, swimming, baseball, soccer, rugby, basketball, and boxing. In addition, it may be e-sports (electronic sport) in which players compete with each other for winning/losing in a computer game. The game genre of the e-sports is not particularly limited, and may be any game genre. For example, the game may be a fighting game, a sports game, a shooting game, a race game, a puzzle game, a card game, a board game, a role playing game, a simulation game, or the like. The e-sports may be an individual match or a team match. Humans may battle each other as players, or a human and a computer (for example, AI, robot, or the like) may battle each other.

The competition information is a program table of a competition, odds, prediction of experts and the like, a competition video, a competition result (including information on refunds), or the like.

Here, the program table of the competition is a list of competition objects that participate in each competition, and includes a list to which basic information on the competition objects and information helpful in prediction such as past results are attached. For example, in a case where the competition is a bicycle race, about 9 to 12 races are conducted per day for each venue, and the program table in that case includes a program table in which information on a plurality of venues is collected, a program table for each venue, a program table for each race, or the like. In addition, in the program guide, a frame number, a vehicle number, condition, characteristics (class classification, leg quality, and the like), past results, and the like of a bicycle racer as a competition object are also described.

The point is a value corresponding to the first value of the present invention and provided to the user U in accordance with the betting action of the user U, and is an extra reward provided in a certain amount in addition to a payout regardless of whether the prediction is right or wrong in a case where the user U bets on the result of the competition. The payout is currency (money) used for exchange with things or services in general society, but the point has a value different from that of the currency, and is used as a medium having a value of exchange with a benefit to be described later in a point management system S. The points can be accumulated for a predetermined period or an indefinite period. Note that, in the present embodiment, since the point is provided in a case where betting is performed on a result of a competition, the user U cannot acquire the point unless the user U experiences the betting.

The amount of points to be provided can be appropriately set. An example will be described below.

(a) In a case where the betting result is losing, more points are provided than in a case where the betting result is winning. In other words, in a case where the prediction is wrong and a loss occurs, the amount of points to be provided having a value different from the third value such as currency or the like increases, and the loss is compensated by the points.

(b) The amount of points to be provided is changed based on a betting amount of money corresponding to a lost bet among the betting amount of money (the amount of the third value put on a bet). For example, when a bet for 2,000 yen out of bets for 10,000 yen is won, the amount of points to be provided is determined based on 8,000 yen corresponding to the lost bet. That is, the more the betting amount of money corresponding to a lost bet (the amount of loss), the more the amount of points to be provided increases, and the loss is further compensated.

(c) The amount of points to be provided is changed based on a difference between the betting amount of money (the amount of the third value put on a bet) and the payout amount (the amount of the third value obtained owing to right prediction). For example, in a case where 10,000 yen is bet and a part of the bet is won and a payout of 8,000 yen is obtained, the amount of points to be provided is determined based on the difference of 2,000 yen. That is, in a case where a part of the bet is won but the total balance is negative and there is a loss, the more the amount of loss is, the more the amount of point to be provided increases to compensate the loss. Here, a case where the payout amount is lower than the betting amount of money has been exemplified, but this applies also to a case where the payout amount is higher than the betting amount of money. For example, if the amount of points to be provided is further increased in addition to the payout when the prediction is right, it is possible to further arouse the passion for gambling.

(d) The amount of points to be provided is changed based on a cumulative number of times of betting or a cumulative betting amount of money (cumulative consumption amount of the third value put on bets). That is, if the amount of points to be provided is increased according to the cumulative value of the number of times of betting or the betting amount of money, betting motivation can be more and more attracted.

(e) The amount of points to be provided is changed based on the number of types of competitions that are subjects of betting. For example, in a case where the number of types of competitions that are subjects of betting is large, it is possible to arouse betting motivation for more competitions by increasing the amount of points to be provided.

Unlike the competition, the game is an online game provided by the game management server 40 to be described later, and is an electronic game that progresses while a player digests various generated quests and plays (hereinafter, referred to as play). As an example of the game, there is a game in which the user U organizes a team including a plurality of characters, fights against an enemy character by operating the characters with a predetermined action, and sequentially challenges and clears a plurality of quests prepared in the game, whereby the game proceeds. Furthermore, the game of the present embodiment may be a game using the above-described competition as a subject, for example, a game of raising a racehorse in the game, a game of operating a racehorse, a boat, a bicycle, a two-wheeled vehicle, a four-wheeled vehicle, or the like in the game to race, or the like.

Note that the game of the present embodiment can be updated to a predetermined version (specifically, the latest version and the like) by distributing (releasing) update data. Hereinafter, updating the version of the game to a predetermined version is also referred to as releasing a predetermined version of the game.

In the game of the present embodiment, the user U can obtain an object such as a free item (including a free lottery item) corresponding to the second value of the present invention in a case where a predetermined condition such as log-in to the game is satisfied. Furthermore, the user U can obtain an object such as a paid item (including a paid lottery item) corresponding to the predetermined game medium by paying a predetermined fee (paying an in-game charge). Furthermore, in the game of the present embodiment, a lottery is performed based on an object provision request (hereinafter, referred to as a lottery application) from the user U, and the user U can obtain an object the user U won in the lottery.

The quest is a task given to the user U in the game, that is, an individual event that is a constituent of the game. Specifically, the quest of the present embodiment includes a quest of using a character possessed by the user U to fight against an enemy character, a quest of challenging a designated race or a large race, or the like. In each of these quests, an achievement condition is set. For example, the user U plays a quest during the quest-playable period, satisfies a preset achievement condition such as killing an enemy character or winning a race and ends the quest, so that the quest is cleared, and the user U who has cleared the quest can obtain a clearing reward.

Among the quests, there is also a specific game with limited play conditions. For example, a quest that cannot be played unless the game experience value of the user U reaches a predetermined level, a quest that cannot be played unless the user possesses a specific item (for example, including benefits described later), or the like corresponds to the specific game. In addition, a quest in which a cooperative play described later can be performed also corresponds to the specific game.

The object includes, for example, a character that moves in accordance with the operation of the user U in the game, an item used for advantageously advancing the game, and the like. The number of possessed objects increases according to log-in to the game, the clearing reward, purchase, or the like, in addition to a lottery. Furthermore, the number of objects possessed is reduced by consumption or disposal in the game.

The lottery is one of events in the game in which the object is obtained, and is performed in response to the lottery application by the user U during the play of the game. In the lottery, a plurality of objects having different winning probabilities are prepared as candidates, one or a predetermined number of objects are won from among the plurality of objects as candidates, and the won object is provided to the user U. Note that, the plurality of objects serving as candidates also include a predetermined object having rarity.

The predetermined object is an object that is generally difficult to obtain due to a low winning probability, has a high rarity value, is distributed in a small amount in the game, and is not often used by the user U in past, or the like. However, in the present embodiment, the predetermined object includes, in addition to the object corresponding to the above definition, an object having a high ability, an object that is useful when used for a character because of a large ability change, an object proper for clearing of each quest, an object having a high demand (high popularity) of the user U, or the like regardless of the winning probability or the like.

The lottery has various forms, and includes, for example, a single type lottery performed only once, and an N-series type lottery in which N times (N is a natural number of 2 or more) of lotteries are continuously performed. Further, there are various conditions for performing the lottery. Specifically, the lottery of the present embodiment may include the following lotteries.

(a) A lottery that can be performed by consuming points (first value) available upon betting.

(b) A lottery that can be performed by consuming a free lottery item (one type of the second value) available for free.

(c) A lottery that can be performed by consuming a paid lottery item (one type of the predetermined game medium) purchased for a fee.

(d) A lottery that can be performed as a quest clearing reward (including both a case where the lottery is performed by consuming a lottery item acquired as the quest clearing reward and a case where the right to perform the lottery is directly provided as the clearing reward).

(e) A lottery that can be performed by consuming a benefit to be described later.

The user U can also obtain the third value usable in betting such as a dedicated token based on the result of the lottery. For example, in a case where an object other than the predetermined object is won, a relatively large amount of the third value is provided to the user U. Conversely, in a case where the predetermined object is won, a relatively small amount of the third value is provided to the user U.

Furthermore, the user U can also obtain the third value usable in betting such as a dedicated token based on the payment amount for the game or the consumption amount of the paid lottery item that is one type of the predetermined game medium. For example, as the number of lotteries in the above (c) increases, a larger amount of the third value is provided to the user U.

The benefit is a value that can be acquired by consuming the points, that is, converting the points based on a predetermined conversion rate, and is a value (medium) that can be used when the lottery is performed in the game. Note that, the lottery also can be performed not by consuming the benefit but by consuming the points, and in this case, performing the lottery corresponds to the benefit.

In the lottery, when the lottery is performed by consuming the benefit or the points that are the first value, the winning probability of the predetermined object having rarity is set to be higher than when the lottery is performed by consuming the free lottery item that is the second value. For example, the winning probability of the predetermined object having rarity is set to increase in the order of the free lottery item, the point, the benefit, and the paid lottery item. Note that, the winning probability of the predetermined object having rarity in the lottery that can be performed as a quest clearing reward varies depending on the play condition, difficulty level, and the like of the target quest.

The conversion rate is used when the point is converted into the benefit, and is an exchange rate between the point and the benefit. Specifically, the amount of the benefits to be provided is calculated by multiplying the point by the conversion rate.

The conversion rate is set for each game genre or game title. For example, a conversion rate in a game related to a competition or a game recommended to be played by a game providing company is set higher than a conversion rate in other games. For example, in a case where the degree of relevance between the competition and the game is high (in a case of a relationship between a horse race and a horse race game), the conversion rate is set high. Furthermore, for a new game (including a game that has been updated to release a predetermined version), the conversion rate is set to be higher than a normal rate (conversion rate after a predetermined period elapses) until a predetermined period (for example, one week) elapses from a release time point of the game.

Furthermore, the conversion rate may be set based on the number of users or the like associated with the game. The number of users includes, for example, the number of active users of the game, the number of users who downloaded the game, the number of users who actually played the game in the latest predetermined period, or the like.

Furthermore, the conversion rate may be set based on the play history of the user U. For example, for a new user U who has just started the game or a user U who has a little game experience (hereinafter, referred to as a beginner user) or the like, the conversion rate may be set higher from the time of the first play until a certain period of time elapses. Furthermore, the conversion rate may be set higher for the user U who has not played the game for a predetermined period or more, for example, for the user U (referred to as a dormant user) who has passed a predetermined period from the date of final log-in to the game. Conversely, the conversion rate may be set higher for the user U (referred to as a heavy user) who frequently plays the game all the time.

In the game of the present embodiment, there is a specific game (including a lottery having limited performing conditions) that the user U cannot play unless the user U consumes a predetermined amount of benefit. In a case where the amount of the benefit to be provided according to the betting amount of money (the amount of the third value put on the betting) changes for such a specific game and the benefit possessed by the user U is less than a predetermined amount, the user may be notified of the betting amount of money necessary for the benefit to satisfy the predetermined amount. For example, information such as "if you bet another 1,000 yen, you can participate in the special lottery being held in Game A" is notified to the user U.

Furthermore, in a case where the sum of the benefit possessed by the user U and the benefit to be provided based on the betting amount of money designated by the user U is less than a predetermined amount before the user U performs the betting, the betting amount of money necessary for the sum of the benefits to satisfy the predetermined amount may be notified to the user U. Furthermore, the necessary betting amount of money may be notified to the user U based on a difference between the predetermined amount and the amount of the benefit possessed by the user U.

In addition, information or the like regarding a specific game performed in a game selected based on the game play history of the user U may be notified to the user U.

In the present embodiment, the user U can also interact with other users U in using the points. For example, in a case where there is a friendship between two users U (referred to as users Ua and Ub for convenience) and the users mutually approve, the user Ub is associated with the user Ua as a friend user of the user Ua. Then, in a case where the friend user Ub associated with the user Ua has acquired points by betting on the result of the competition, the user Ua is notified of information regarding the friend user Ub (including information regarding the competition related to the betting of the friend user).

Furthermore, in a case where the friend user Ub associated with the user Ua has acquired points by betting on the result of the competition and is playing a game using the points, the user Ua is notified of information regarding the game such as the game title played by the friend user Ub.

In the present embodiment, needless to say, the user U can play alone; and also so-called multi-play (hereinafter, referred to as cooperative play) in which a plurality of users U operate their user terminals 10 to simultaneously play for a common quest is possible. This cooperative play is one type of the specific game described above. In the cooperative play, a cooperative relationship is formed by a user U (hereinafter, referred to as a host) who hosts the cooperative play for a certain quest and recruits a companion and a user U (hereinafter, referred to as a guest) who applies for the recruitment and participates in the cooperative play, and the progress of the play is synchronized between the users who perform the cooperative play. In the present embodiment, the cooperative play is limited to a quest that can be played when both the host and the guest consume the benefit. However, even in a case where different conditions are satisfied, the cooperative play may be performed.

The cooperative play is performed through a communication function of the user terminal 10 of each user U. Specifically, when a certain user U applies for participation in the cooperative play for which the host recruit and the host permits the application, a communication path for the cooperative play is established between that user U as a guest and the host. Note that, the qualification for applying for the cooperative play is not particularly limited, and can be freely set. For example, a friend user may be able to make an application.

Thereafter, transmission and reception of various types of data required for the cooperative play are performed according to a known communication method. The data communication method at this time may be a client-server method via the game management server 40 or a peer-to-peer (P2P) method not via the game management server 40. In addition, a mode of cooperative play is classified into a fully synchronous type and an asynchronous type, but any mode may be adopted. Note that, the fully synchronous type includes a key input synchronization method and a command input method, and the asynchronous type includes a server centralized processing type and a client distributed processing type.

Cooperative play type games include a cooperative play game in which a plurality of users U cooperate with each other and a battle game in which users U battle each other, but the game of the present embodiment may be any type. Furthermore, the upper limit (maximum number of players) of the number of users U in one cooperative play is not particularly limited, and may be set to any number.

<Configuration of Point Management System S>

Next, a configuration of the point management system S will be described.

As illustrated in FIG. 1, the point management system S includes an information terminal (hereinafter, referred to as a user terminal 10) operated by each user U, the point management server 30, and the game management server 40. In addition, the user terminal 10, the point management server 30, and the game management server 40 are communicably connected to each other via a network N such as the Internet. Furthermore, the point management system S is communicably connected to a public competition-side server 50 via the network N.

The user terminal 10 is equipped with a program stored in the terminal and a processor that executes the program, and is carried by a user U who is an owner of the user terminal. The user U operates the user terminal 10 when betting on a result of a competition, playing a game, or the like.

As the user terminal 10, a known device used as an information processing terminal, for example, various devices such as a smartphone, a mobile phone, a laptop computer, a tablet terminal, a wearable terminal, or a game dedicated device having a communication function can be used. Note that, the number of user terminals 10 included in the point management system S is not particularly limited and may be any number. However, in FIG. 1, for convenience of illustration, the number of user terminals 10 is three.

The point management server 30 is a computer that is a constituent of the information processing apparatus of the present invention, and is constituted by, for example, a server computer managed by a game providing company, and is responsible for a process related to points and benefits. Specifically, the point management server 30 provides a point to a user U and provides a benefit converted by consumption of the point. In addition, the point management server 30 manages an account, point acquisition information, point conversion information, and the like of a user U for each user U. Note that, the point management server 30 is not limited to one constituted of a single server computer that independently exhibits a specific function, and may include a plurality of server computers that exist in a distributed manner but cooperate to exhibit a specific function.

The game management server 40 is a computer that is a constituent of the information processing apparatus of the present invention, and is constituted by, for example, a server computer managed by a game providing company, and is responsible for a progress process of a game for each game. Specifically, the game management server 40 manages the game account, the status, and the like of a user U for each user U, and distributes data (hereinafter, referred to as game progress data) regarding the progress process of the game to each user U. Note that the game management server 40 is not limited to one constituted of a single server computer that independently exhibits a specific function, and may include a plurality of server computers that exist in a distributed manner but cooperate to exhibit a specific function. In addition, the number of the game management servers 40 included in the point management system S is not particularly limited and may be any number. However, in FIG. 1, for convenience of illustration, the number of game management servers 40 is two.

The public competition-side server 50 includes, for example, a server computer managed by an organization or the like that hosts the public competition, and performs processes such as provision of competition information or the like, calculation of odds, reception of betting, and execution of payback. Specifically, the public competition-side server 50 directly or indirectly performs reception of betting and payback to the user U, and distributes various data (hereinafter, referred to as competition information data) related to the competition. Furthermore, the public competition-side server 50 provides the point management server 30 with betting history data including information regarding the betting history (including the betting amount of money and the betting result) of the user U in addition to the above-described competition information data. Note that the public competition-side server 50 is not limited to one constituted of a single server computer that independently exhibits a specific function, and may include a plurality of server computers that exist in a distributed manner but cooperate to exhibit a specific function. In addition, the number of the public competition-side servers 50 included in the point management system S is not particularly limited and may be any number. However, in FIG. 1, for convenience of illustration, the number of public competition-side servers 50 is one.

Note that, in the present embodiment, the public competition-side server 50 is not included in the point management system S and is a device outside the system, but the public competition-side server 50 may also be included in a part of the point management system S.

The network N may be any network that connects the user terminal 10, the point management server 30, the game management server 40, and the public competition-side server 50 in a data-communicable manner. The network N includes the Internet, a mobile communication network, a local area network (LAN), a wide area network (WAN), an intranet, Ethernet (registered trademark), and the like, regardless of whether it is wired or wireless. Furthermore, the user terminals 10 may communicate with each other via the network N, or may directly communicate with each other without the network N through Bluetooth (registered trademark), Wi-Fi Direct, or the like.

In the point management system S of the present embodiment, with the above configuration, the user terminal 10, the point management server 30, and the game management server 40 cooperate with the public competition-side server 50, thereby providing points and benefits and advancing the game. Specifically, a part of the process is performed by the point management server 30, the game management server 40, and the public competition-side server 50, and a part of the graphic process or the like is executed by the user terminal 10. For example, the point management server 30, the game management server 40, and the public competition-side server 50 execute programs including certain rules, logics, and algorithms in cooperation with each other. On the other hand, the user terminal 10 executes a program including rules, logics, and algorithms similar to the program executed by the point management server 30, the game management server 40, and the public competition-side server 50 in synchronization with these servers. As a result, the user terminal 10 executes provision of points, provision of benefits, advancing the game (including a lottery and a specific game), and notification.

<Configuration of User Terminal 10>

Next, a configuration of the user terminal 10 according to the present embodiment will be described.

Figure 2:
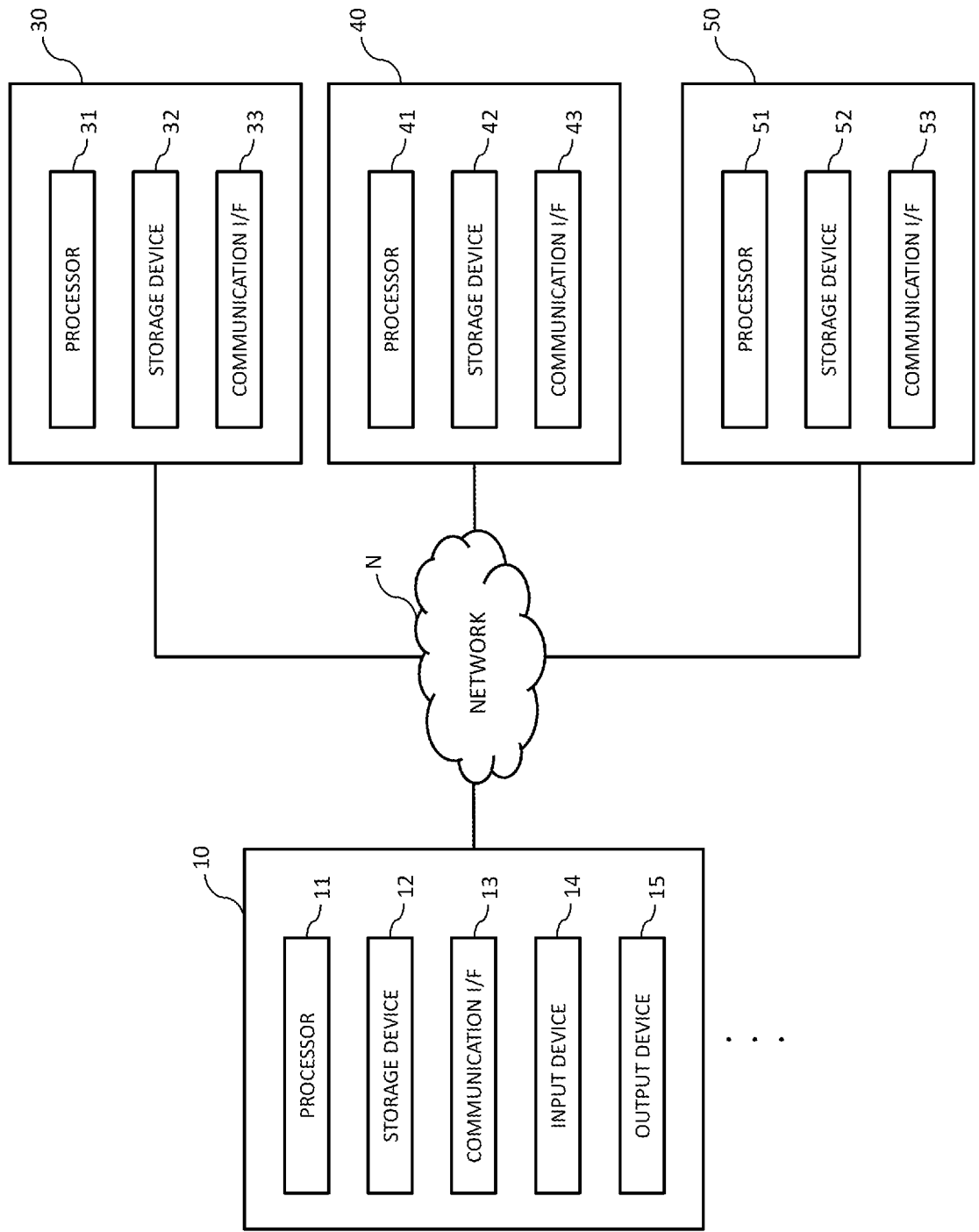
FIG. 2 is a diagram illustrating a hardware configuration of each of an information processing apparatus, a terminal, and a server for public competition according to an embodiment of the present invention.

As illustrated in FIG. 2, the user terminal 10 includes a processor 11, a storage device 12, a communication interface (in FIG. 2, described as a communication I/F) 13, an input device 14, and an output device 15 as a hardware configuration. These components are electrically connected via a bus (not shown).

The processor 11 includes, for example, a central processing unit, a micro processing unit, a graphics processing unit, a digital signal processor, or the like. The processor 11 executes various types of arithmetic processes based on programs or data stored in the storage device 12 and controls each unit of the user terminal 10. The programs executed by the processor 11 include an operating system (OS) which is system software for controlling the entire user terminal 10, an application program for making a bet on a competition result, an application program for a game (including a point conversion function), and the like. When these various programs are read and executed by the processor 11, the user terminal 10 exerts a function as one device that is a constituent of the point management system S.

The storage device 12 includes, for example, a memory, a storage, or the like, and stores various programs or data.

The memory is constituted of a semiconductor memory such as a read only memory (ROM) and a random access memory (RAM), provides a work area to the processor 11 by temporarily storing programs and data, and temporarily stores various data generated by process executed by the processor 11.

The storage stores various data related to a game, and includes, for example, a flash memory, a hard disc drive (HDD), a solid state drive (SSD), a flexible disc (FD), a magneto-optical disc (MO), a compact disc (CD), a digital versatile disc (DVD), a secure digital card (SD), a universal serial bus (USB) memory, and the like.

The communication interface 13 is constituted of, for example, a network interface card (NIC) or the like, and controls a communication process of the user terminal 10. The communication standard of the communication interface 13 is not particularly limited, and any standard can be applied without limitation as long as it is a public communication standard. Furthermore, the communication method by the communication interface 13 may be a wireless method or a wired method.

The input device 14 is a device that receives an operation of the user U and generates data indicating the content of the received operation. As an example of the input device 14, an operation key, an operation button, a sound collection microphone, a photographing camera, and the like provided in the user terminal 10 can be used.

The output device 15 is a device that performs drawing on a screen to display an image, character string information, and the like, and reproduces sound. As an example of the output device 15, a liquid crystal display or an organic electroluminescence (EL) display, a head mounted display, a speaker, and the like provided in the user terminal 10 can be used. In the present embodiment, at least a display is provided as the output device 15. The display may have both functions of the input device 14 and the output device 15 like a touch panel display.

Next, the configuration of the user terminal 10 will be described again from a functional aspect with reference to FIG. 3.

Figure 3:
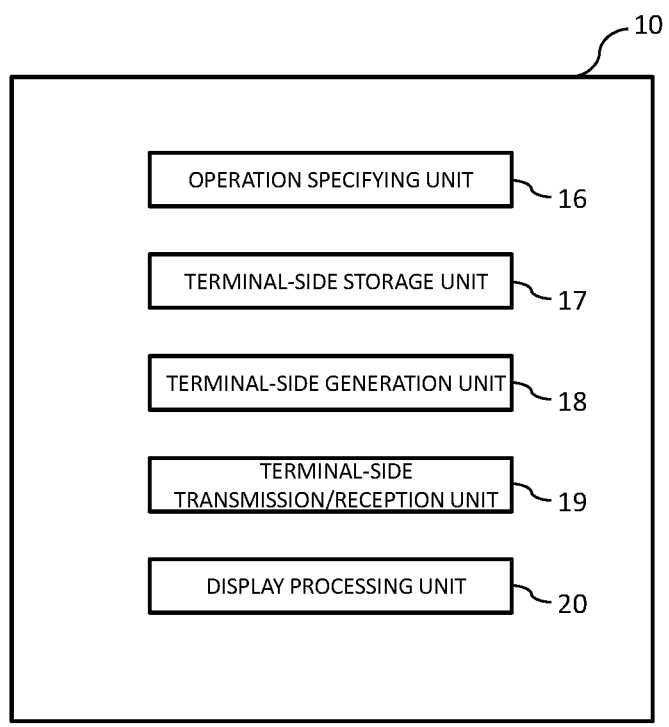
FIG. 3 is an explanatory diagram of functions of the terminal according to an embodiment of the present invention.

As illustrated in FIG. 3, the user terminal 10 includes a plurality of functional units, specifically, an operation specifying unit 16, a terminal-side storage unit 17, a terminal-side generation unit 18, a terminal-side transmission/reception unit 19, and a display processing unit 20. These functional units are realized by cooperation between hardware equipment of the user terminal 10 including the processor 11 and a program as software stored in the user terminal 10.

[Operation Specifying Unit 16]

The operation specifying unit 16 is mainly realized by the processor 11 and the input device 14, and specifies contents of various operations performed by the user U through the input device 14 of the user terminal 10. The operation specified by the operation specifying unit 16 includes a betting operation on a result of a competition, an operation for advancing a game, a point conversion operation for converting acquired points into a benefit, and the like.

The betting operation on a result of a competition includes an operation of checking the competition information, an operation of designating a type of betting, a competition object, and a betting amount of money, and the like. The operation for advancing a game includes an operation of moving a character or the like in the game by a predetermined action, an operation of instructing application of a lottery, an operation of instructing application of play for a specific game, an operation related to cooperative play (operation related to recruitment for cooperative play, application for cooperative play, and permission or not of application), and the like. The point conversion operation includes an operation of designating the amount of points to be converted, and the like.

[Terminal-Side Storage Unit 17]

The terminal-side storage unit 17 is mainly realized by the processor 11 and the storage device 12, and stores, for example, competition information data and game progress data including video data, image data, text data, audio data, and the like, and the like.

[Terminal-Side Generation Unit 18]

The terminal-side generation unit 18 is mainly realized by the processor 11 and the storage device 12, and generates betting operation data, game operation data, point conversion operation data, and the like according to the operation content of the user U specified by the operation specifying unit 16.

The generated game operation data includes lottery application instruction operation data based on an operation of instructing application for a lottery, game play application instruction operation data based on an operation of instructing application for play in a specific game, data for cooperative play based on an operation related to cooperative play, and the like. In addition, the betting operation data includes information regarding the designated type of betting, competition object, betting amount, and the like. Furthermore, the point conversion operation data includes information regarding the amount of points designated for conversion.

The generated various types of data are transmitted by the terminal-side transmission/reception unit 19 to the point management server 30, the game management server 40, the public competition-side server 50, and the user terminal 10 of another user U.

[Terminal-Side Transmission/Reception Unit 19]

The terminal-side transmission/reception unit 19 is mainly realized by the processor 11, the storage device 12, and the communication interface 13, and transmits and receives data and information to and from the point management server 30, the game management server 40, the public competition-side server 50, and the user terminal 10 of another user U.

For example, when betting is performed on a result of a competition, the terminal-side transmission/reception unit 19 receives the competition information data and the betting history data sent from the public competition-side server 50, and transmits the betting operation data to the public competition-side server 50. In addition, during play of a game, the terminal-side transmission/reception unit 19 receives the game progress data transmitted from the game management server 40 and transmits the game operation data to the game management server 40. Furthermore, in a case where the cooperative play is performed in a game, the terminal-side transmission/reception unit 19 may transmit and receive game operation data (specifically, data for cooperative play) to and from the user terminal 10 of another user U. Further, when points are acquired or converted into benefits, the terminal-side transmission/reception unit 19 receives the point information data, the benefit information data, or the user information data transmitted from the point management server 30, and transmits the point conversion operation data to the point management server 30.

[Display Processing Unit 20]

The display processing unit 20 is mainly realized by the processor 11, the storage device 12, and the output device 15, and executes a display process of displaying data and information received by the terminal-side transmission/reception unit 19 on the display by a browsing function.

More specifically, the display processing unit 20 draws a betting screen when betting on a result of a competition is performed, expands the competition information data received by the terminal-side transmission/reception unit 19 from the public competition-side server 50 during the competition, and displays the competition video and other information on the screen. In addition, the display processing unit 20 draws a game screen at the start of a game, develops the game progress data received by the terminal-side transmission/reception unit 19 from the game management server 40 during the game play, and displays the game video and other information on the screen. Furthermore, when points are acquired or converted into the benefit, the display processing unit 20 expands the point information data, the benefit information data, or the user information data received from the point management server 30 and displays the information on the screen.

<Configuration of Point Management Server 30>

Next, the point management server 30 according to the present embodiment will be described.

As illustrated in FIG. 2, the point management server 30 has a hardware configuration similar to that of a general server computer, and includes a processor 31, a storage device 32, and a communication interface 33, and these devices are electrically connected via a bus (not shown).

The processor 31 is constituted of a CPU, an MPU, a GPU, a DSP, and the like, and executes various processes by executing a program installed in the point management server 30. Programs executed by the processor 31 include an OS that is system software for controlling the entire point management server 30, an application program for causing the point management server 30 to function as the information processing apparatus of the present invention, and the like.

The storage device 32 includes, for example, a memory, a storage, or the like, and stores various programs or data.

The memory is constituted of a semiconductor memory such as a ROM and a RAM, provides a work area to the processor 31 by temporarily storing programs and data, and temporarily stores data generated through various processes executed by the processor 31.

The storage stores various data related to the user U, a game, and the like, and is constituted of, for example, a flash memory, an HDD, an SSD, an FD, an MO disk, a CD, a DVD, an SD card, a USB memory, and the like. Note that, a server computer for a database connected to the point management server 30 via the network N may be used as a storage.

The communication interface 33 is constituted of, for example, a network interface card or the like, and controls a communication process of the point management server 30. The standard of communication by the communication interface 33 is not particularly limited, and can be applied without limitation as long as it is a public communication standard. Furthermore, the method of communication by the communication interface 33 may be a wireless method or a wired method.

Next, the configuration of the point management server 30 will be described again from a functional aspect with reference to FIG. 4.

Figure 4:
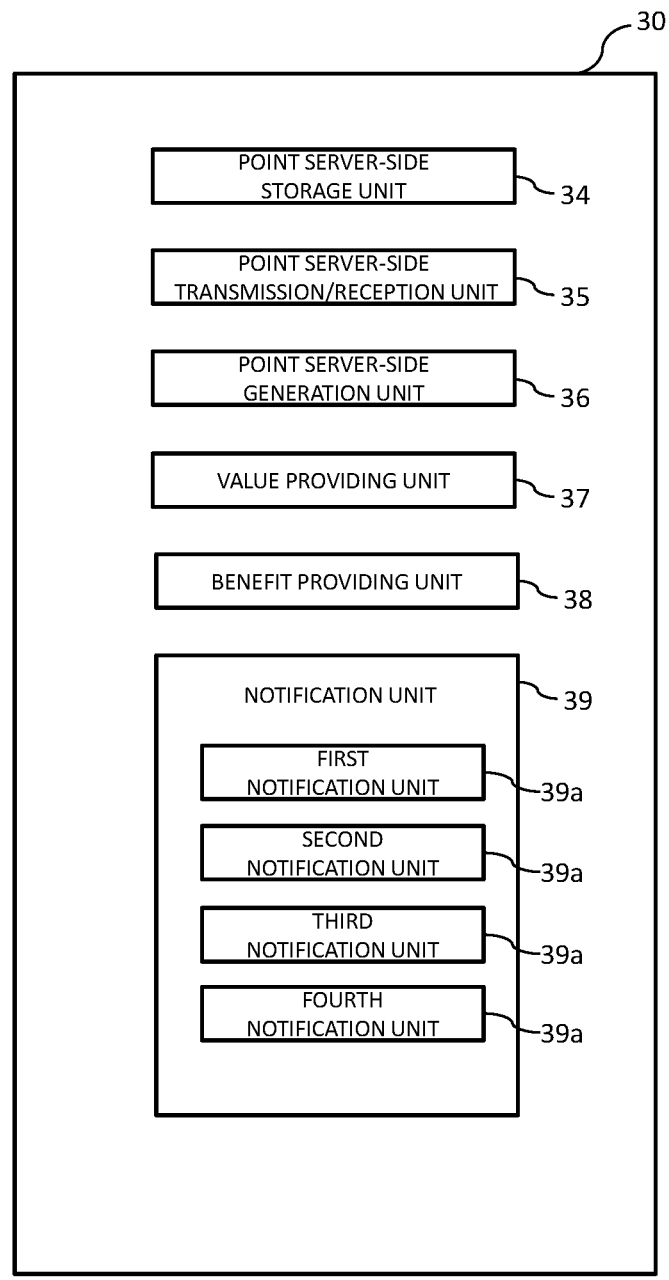
FIG. 4 is an explanatory diagram of functions of a point management server that is a constituent of the information processing apparatus according to the embodiment of the present invention.

As illustrated in FIG. 4, the point management server 30 includes a plurality of functional units, specifically, a point server-side storage unit 34, a point server-side transmission/reception unit 35, a point server-side generation unit 36, a value providing unit 37, a benefit providing unit 38, and a notification unit 39. These functional units are realized by cooperation between hardware equipment of the point management server 30 including the processor 31 and a program that is software stored in the point management server 30. Note that, in a case where the point management server 30 is constituted of a plurality of computers, the above-described functions may be separated, and the plurality of computers may separately exhibit different functions.

[Point Server-Side Storage Unit 34]

The point server-side storage unit 34 is mainly realized by the processor 31 and the storage device 32, and stores various data such as user information data regarding the user U, point information data including data regarding points and benefits, and benefit information data.

As illustrated in FIG. 5, the user information data includes an identifier (user ID or terminal ID) that identifies the user U or the user terminal 10 used by the user U, and information associated with the identifier. The information associated with the identifier includes, for example, personal information of the user U, a model of the user terminal 10, a payment history, a betting history, the number of possessed points, the number of possessed benefits, information indicating a game being played, and the like. Note that, the user information data is associated with data regarding the user U stored in the game management server 40 to be described later.

As illustrated in FIG. 6, the point information data includes information regarding the amount of points to be provided set according to a user attribute (user ID), a betting result, the type of competition, or the like.

Figure 7:
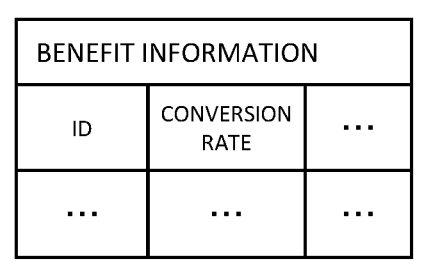

As illustrated in FIG. 7, the benefit information data includes information regarding a conversion rate from points to a benefit set according to a user attribute (user ID), the type of a game, or the like.

[Point Server-Side Transmission/Reception Unit 35]

The point server-side transmission/reception unit 35 is mainly realized by the processor 31, the storage device 32, and the communication interface 33, and transmits and receives data and information to and from the user terminal 10, the game management server 40, and the public competition-side server 50.

For example, the point server-side transmission/reception unit 35 transmits the point information data, the benefit information data, or the user information data to the user terminal 10, and receives the point conversion operation data, which is an instruction to convert points into a benefit, from the user terminal 10. In addition, the point server-side transmission/reception unit 35 transmits the notification data to the user terminal 10. In addition, the point server-side transmission/reception unit 35 transmits the point information data, the benefit information data, or the user information data to the game management server 40, and receives the user information data from the game management server 40. In addition, the point server-side transmission/reception unit 35 receives the competition information data and the betting history data from the public competition-side server 50.

[Point Server-Side Generation Unit 36]

The point server-side generation unit 36 is mainly realized by the processor 31 and the storage device 32, and generates various data to be stored in the point server-side storage unit 34 or transmitted by the point server-side transmission/reception unit 35.

The various data generated by the point server-side generation unit 36 includes the following data.

(a) Point information data that includes information regarding points, such as an amount of points to be provided set according to a user attribute, a betting result, the type of competition, or the like.

(b) Benefit information data including information regarding a benefit, such as a conversion rate from points to a benefit set according to a user attribute, the type of a game, or the like.

(c) User information data including the number of possessed points and benefits for each user U, information for specifying a friend user associated with the user U, and the like.

(d) Notification data including a betting history or the like of a friend user.

[Value Providing Unit 37]

The value providing unit 37 is mainly realized by the processor 31 and the storage device 32, and provides a point that is the first value to the user U who has predicted and made a bet on a result of a competition.

In the present embodiment, the value providing unit 37 further performs the following processes.

(a) When the betting result is losing, the value providing unit 37 sets the amount of points to be provided to be larger than when the betting result is winning.

(b) The value providing unit 37 changes the amount of points to be provided based on the betting amount of money corresponding to a lost betting result.

(c) The value providing unit 37 changes the amount of points to be provided based on the difference between the betting amount of money and the payout amount.

(d) The value providing unit 37 changes the amount of points to be provided based on at least one of the cumulative number of times of betting and the cumulative betting amount of money of the user U.

(e) The value providing unit 37 changes the amount of points to be provided based on the amount of consumed third value out of the third value usable in betting such as currency or a dedicated token.

(f) The value providing unit 37 provides the second value such as a free item usable in a game to the user based on a predetermined condition such as log-in to the game.

(g) The value providing unit 37 provides the third value usable in betting such as currency or a dedicated token to the user based on the result of a lottery.

(h) The value providing unit 37 provides the third value usable for betting to the user based on the amount of payment for a game or the amount of consumption of a predetermined game medium such as a paid item in a game.

Note that, the provided point is stored in the point server-side storage unit 34 in association with each user U who is the provision object.

[Benefit Providing Unit 38]

The benefit providing unit 38 is mainly realized by the processor 31 and the storage device 32, and consumes the points that are the first value, converts the points into a benefit usable in a game, and provides the benefit to the user U. At this time, the benefit providing unit 38 changes the amount of benefits to be provided based on the amount of consumed points.

Specifically, the benefit providing unit 38 provides a benefit to the user U by converting at least some of points into a benefit based on a conversion rate set as follows according to the game.

(a) It is set in accordance with an elapsed period from release of a predetermined version of a game. Specifically, the benefit providing unit 38 monitors an elapsed time from release of a predetermined version of a game, and sets the conversion rate based on the elapsed time.

(b) The benefit providing unit 38 sets it based on the play history of the user U in a game.

(c) The benefit providing unit 38 sets the conversion rate based on the degree of relevance between a game and a competition. For example, if the genre of a game and that of a competition are the same, the benefit providing unit 38 determines that the degree of relevance is high and also sets the conversion rate high.

(d) The benefit providing unit 38 sets the conversion rate based on the number of users associated with a game (the number of active users of the game, the number of users who downloaded the game, the number of users who actually played the game in the latest predetermined period, or the like).

Note that, the provided benefit is stored in the point server-side storage unit 34 or a game server-side storage unit 44 in association with each user U who is the provision object.

[Notification Unit 39]

The notification unit 39 is mainly realized by the processor 31, the storage device 32, and the communication interface 33, and notifies the user U of various types of information in cooperation with the point server-side transmission/reception unit 35. As illustrated in FIG. 4, the notification unit 39 includes a first notification unit 39a, a second notification unit 39b, a third notification unit 39c, and a fourth notification unit 39d.

The first notification unit 39a calculates a betting amount of money (third value amount) based on the following conditions, transmits notification data including information regarding the calculated betting amount of money to the user terminal 10, and notifies the user U of the data.

(a) In a case where benefits possessed by the user U is less than a predetermined amount necessary for playing a specific game, the first notification unit 39a calculates the betting amount of money necessary for the amount of benefits to satisfy the predetermined amount.

(b) In a case where the sum of benefits possessed by the user and benefits to be provided based on the betting amount of money designated by the user is less than the predetermined amount before execution of betting, the first notification unit 39a calculates the betting amount of money necessary for the sum of the benefits to satisfy the predetermined amount.

(c) The first notification unit 39a calculates a necessary betting amount of money based on a difference between the predetermined amount and the amount of benefits possessed by the user.

The second notification unit 39b transmits notification data including information regarding a game selected based on the play history of the user in a game (including information related to a specific game such as a lottery whose operation condition is limited) to the user terminal 10 to notify the user U.

In a game, in a case where a friend user associated with the user U acquires points as a result of betting on a result of a competition and is playing the game using the points, the third notification unit 39c transmits notification data including that information to the user terminal 10 to notify the user of that information.

Here, the information to be notified includes information specifying the friend user including the attribute of the friend user and the like, information regarding the game played by the friend user by using the acquired points, and the like. The information regarding the game played by the friend user by using the acquired points is at least information indicating the type of the game such as a game title.

In a game, in a case where a friend user associated with the user U acquires points as a result of betting on a result of a competition, the fourth notification unit 39d transmits notification data including that information to the user terminal 10 to notify the user of that information.

Here, the information to be notified includes information specifying the friend user including the attribute or the like of the friend user, information regarding a competition related to betting of the friend user, information regarding points acquired by the friend user or a benefit acquired by consuming the points, and the like. The information regarding a competition related to betting of the friend user is at least information indicating the type of the competition, but may further include information indicating a betting amount of money, a betting result, and the like.

<Configuration of Game Management Server 40>

Next, the game management server 40 according to the present embodiment will be described.

As illustrated in FIG. 2, the game management server 40 has a hardware configuration similar to that of a general server computer, and includes a processor 41, a storage device 42, and a communication interface 43, and these devices are electrically connected via a bus (not shown). Programs executed by the processor 41 include an OS that is system software for controlling the entire game management server 40, an application program for causing the game management server 40 to function as the information processing apparatus of the present invention, and the like. Note that, the configurations of the processor 41, the storage device 42, and the communication interface 43 are substantially similar to those of the point management server 30 described above.

Next, the configuration of the game management server 40 will be described again from a functional aspect with reference to FIG. 8.

Figure 8:
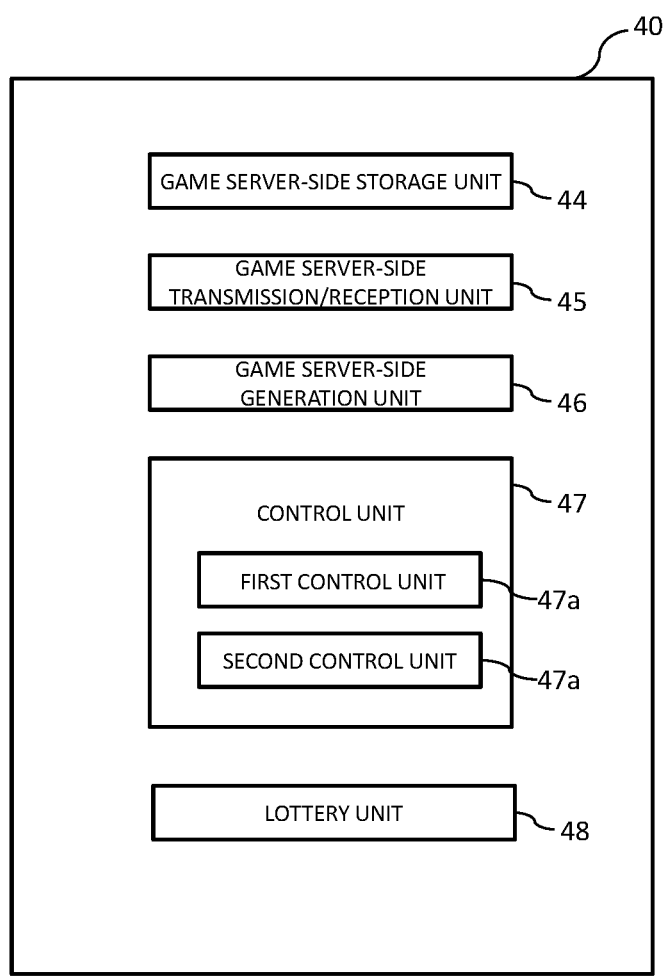
FIG. 8 is an explanatory diagram of functions of a game management server that is a constituent of the information processing apparatus according to the embodiment of the present invention.

As illustrated in FIG. 8, the game management server 40 includes a plurality of functional units, specifically, a game server-side storage unit 44, a game server-side transmission/reception unit 45, a game server-side generation unit 46, a control unit 47, and a lottery unit 48. These functional units are realized by cooperation between hardware equipment of the game management server 40 and a program that is software stored in the game management server 40. Note that, in a case where the game management server 40 is constituted of a plurality of computers, the above-described functions may be separated, and the plurality of computers may separately exhibit different functions.

[Game Server-Side Storage Unit 44]

The game server-side storage unit 44 is mainly realized by the processor 41 and the storage device 42, and stores various data including user information data regarding the user U, game progress data, and the like.

As illustrated in FIG. 9, the user information data includes an identifier (user ID or terminal ID) that identifies the user U or the user terminal 10 used by the user U, and various information associated with the identifier. The information associated with the identifier includes, for example, personal information of the user U, a model of the user terminal 10, a log-in history, a payment history, a betting history, the number of possessed points, the number of possessed benefits, a progress state of a game such as a status, and the like. Note that, the user information data stored in the game server-side storage unit 44 is associated with the user information data stored in the point management server 30.

As illustrated in FIG. 10, the game progress data includes a user attribute (user ID), information regarding a possessed character possessed by the user U, information regarding other objects such as items possessed by the user U, various types of information regarding a quest set for each user U, and the like.

[Game Server-Side Transmission/Reception Unit 45]

The game server-side transmission/reception unit 45 is mainly realized by the processor 41, the storage device 42, and the communication interface 43, and transmits and receives data and information to and from the user terminal 10, and the point management server 30.

For example, during the play of the game, the game server-side transmission/reception unit 45 transmits the game progress data to the user terminal 10 of the user U and receives the game operation data (including the lottery application instruction operation data and the game play application instruction operation data) from the user terminal 10. In addition, the game server-side transmission/reception unit 45 receives the point information data or the benefit information data from the point management server 30. Furthermore, while the cooperative play is performed, the point server-side transmission/reception unit 35 receives the data for cooperative play from the user terminals 10 of the plurality of users U performing the cooperative play, and transmits data for synchronizing the users U (game progress data in a broad sense) to each user terminal 10.

[Game Server-Side Generation Unit 46]

The game server-side generation unit 46 is mainly realized by the processor 41 and the storage device 42, and generates various data to be transmitted by the game server-side transmission/reception unit 45.

The various data generated here specifically include user information data, game progress data corresponding to the game operation data received from the user terminal 10, and the like. The game progress data also includes data for notifying a lottery result and data for starting a specific game. In addition, the game progress data also includes data for synchronizing a plurality of users U performing the cooperative play while the cooperative play of the game is performed, and the like.

[Control Unit 47]

The control unit 47 is mainly realized by the processor 41 and the storage device 42, and controls the progress of a game. As illustrated in FIG. 4, the control unit 47 includes a first control unit 47a and a second control unit 47b.

Among games, particularly in a specific game, the first control unit 47a performs control so that the user can play the specific game by consuming a predetermined amount of benefits.

Particularly in a case where the cooperative play is performed in a specific game among games, the second control unit 47b performs control so that a certain user U and another user U can play together on condition that both of the certain user U and the other user U consume their benefits.

[Lottery Unit 48]

The lottery unit 48 is mainly realized by the processor 41 and the storage device 42, performs a lottery by consuming a benefit, a point, a free lottery item (one type of the second value), or the like possessed by the user U based on a lottery application instruction from the user terminal 10, and provides an object usable in a game to the user U as a lottery result. At this time, the lottery unit 48 sets the winning probability of a predetermined object in a lottery in a case of consuming the benefit or the point to be higher than that in a case of consuming the free lottery item.

<Configuration of Public Competition-Side Server 50>

Next, the public competition-side server 50 according to the present embodiment will be described.

As illustrated in FIG. 2, the public competition-side server 50 has a hardware configuration similar to that of a general server computer, and includes a processor 51, a storage device 52, and a communication interface 53, and these devices are electrically connected via a bus (not shown). Programs executed by the processor 51 include an OS that is system software for controlling the entire public competition-side server 50, an application program for causing the public competition-side server 50 to function in cooperation with the point management system S, and the like. Note that, the configurations of the processor 51, the storage device 52, and the communication interface 53 are substantially similar to those of the point management server 30 and the game management server 40 described above.

Next, the configuration of the public competition-side server 50 will be described again from a functional aspect with reference to FIG. 11.

Figure 11:
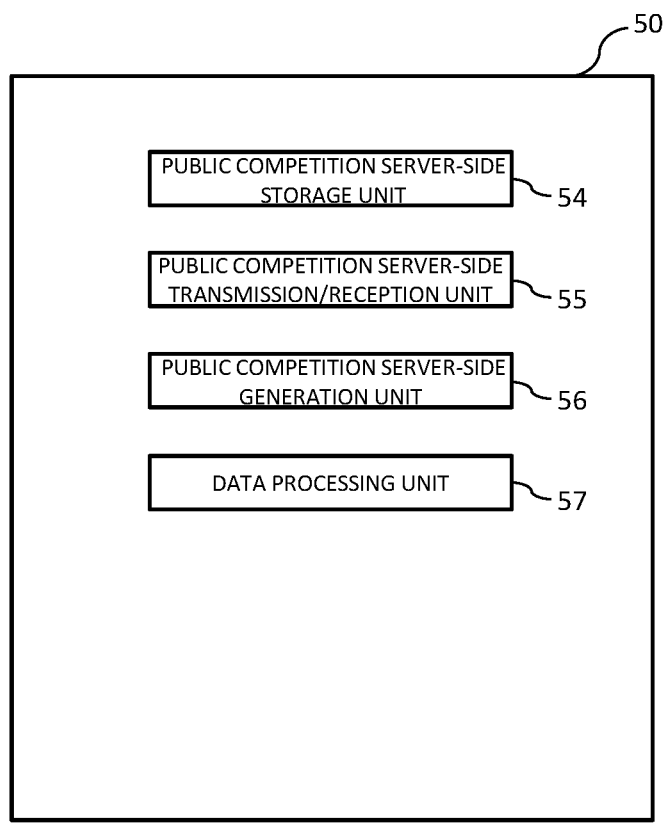
FIG. 11 is an explanatory diagram of functions of a public competition-side server according to an embodiment of the present invention.

As illustrated in FIG. 11, the public competition-side server 50 includes a plurality of functional units, specifically, a public competition server-side storage unit 54, a public competition server-side transmission/reception unit 55, a public competition server-side generation unit 56, and a data processing unit 57. These functional units are realized by cooperation between hardware equipment of the public competition-side server 50 and a program that is software stored in the public competition-side server 50. Note that, in a case where the public competition-side server 50 is constituted of a plurality of computers, the above-described functions may be separated, and the plurality of computers may separately exhibit different functions.

[Public Competition Server-Side Storage Unit 54]

The public competition server-side storage unit 54 is mainly realized by the processor 51 and the storage device 52, and stores various data including competition information data and the like.

[Public Competition Server-Side Transmission/Reception Unit 55]

The public competition server-side transmission/reception unit 55 is mainly realized by the processor 51, the storage device 52, and the communication interface 53, and transmits and receives data and information to and from the user terminal 10, and the point management server 30. For example, the data transmitted to the user terminal 10 and the point management server 30 includes competition information data, betting history data, and the like. Furthermore, the data received from the user terminal 10 includes betting operation data and the like. Note that, the public competition-side server 50 and the user terminal 10 may transmit and receive data via the point management server 30, or may directly transmit and receive data without the point management server 30.

[Public Competition Server-Side Generation Unit 56]

The public competition server-side generation unit 56 is mainly realized by the processor 51 and the storage device 52, and generates data to be transmitted by the public competition server-side transmission/reception unit 55. The generated data includes competition information data, betting history data, and the like.

[Data Processing Unit 57]

The data processing unit 57 is mainly realized by the processor 51 and the storage device 52, and performs various types of data processes in relation to the competition. As an example of the data process, the data processing unit 57 determines a betting result (winning or losing) based on a competition result, and performs the process of paying a payout according to the odds to the user U in a case where the bet is won. In addition, the data processing unit 57 performs a process of calculating the odds by a Parismutuel method, a bookmaker method, or the like, which is a known payout determination method. Note that, the information regarding the calculated odds is included in the competition information data, is stored in the public competition server-side storage unit 54, and is transmitted to the user terminal 10 and the point management server 30 by the public competition server-side transmission/reception unit 55.

The respective configurations of the user terminal 10, the point management server 30, the game management server 40, and the public competition-side server 50 have been described above. Note that, in general, the user terminal 10, the point management server 30, the game management server 40, and the public competition-side server 50 have various functions other than the above. However, here, only the characteristic functions that exert the operational effects in the point management system S according to the present invention are described, and illustration and description of other known functions and the like are omitted.

<Flow of Process of Point Management System S>

Next, a flow of the process executed in the point management system S having the above configuration will be described.

The information processing method according to the present embodiment is realized by using the point management system S functioning as a computer system, in other words, the information processing method according to the present embodiment is applied to the information process executed by the point management system S.

The information process executed in the point management system S according to the present embodiment is mainly constituted of five types of processes: [point providing process], [benefit providing process], [lottery process], [specific game control process], and [notification process]. Hereinafter, each process will be individually described.

[Point Providing Process]

First, the point providing process will be described with reference to FIG. 12.

The point providing process is a process executed in the point management server 30, and refers to a process of providing a point to the user U who performs betting for the result of the competition.

Figure 12:
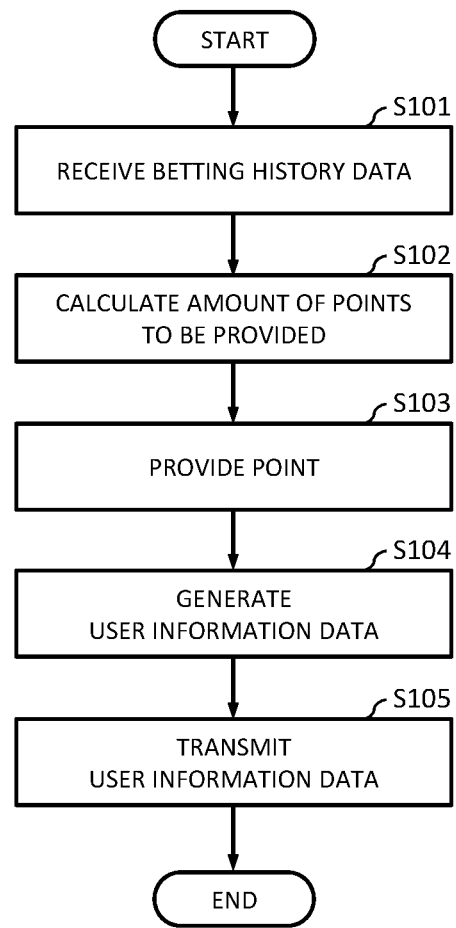
FIG. 12 is a flowchart illustrating a flow of a point providing process.

As illustrated in FIG. 12, upon receiving betting history data indicating that the user U made a bet on a result of a competition from the public competition-side server 50 (S101), the point management server 30 calculates the amount of points to be provided based on a betting amount of money, a betting result, and the like analyzed from the betting history data (S102). Further, the point management server 30 provides the user U with points corresponding to the calculated amount of points to be provided (S103).

Then, upon provision of the points to the user U, the point management server 30 generates user information data indicating that the number of points possessed by the user U has increased (S104). Thereafter, the point management server 30 transmits the generated user information data to the user terminal 10 of the user U (S105).

When the series of processes described above is completed, the point providing process ends. Thereafter, every time the user U makes a bet on a result of a competition, the above-described series of steps is repeated.

The above is an example of the point providing process.

[Benefit Providing Process]

Next, a benefit providing process will be described with reference to FIG. 13.

The benefit providing process is a process executed in the point management server 30, and refers to a process of converting a point into a benefit usable in a game by consuming the point and providing the benefit to the user U.

Figure 13:
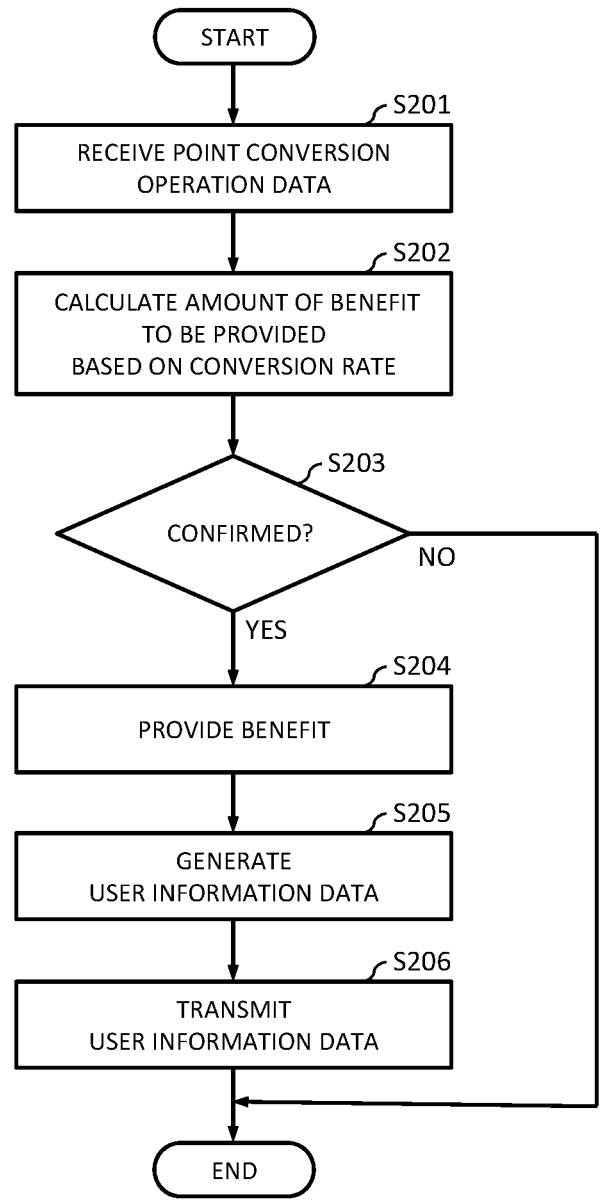
FIG. 13 is a flowchart illustrating a flow of a benefit providing process.

As illustrated in FIG. 13, the point management server 30 receives point conversion operation data from the user terminal 10 as an instruction (point conversion instruction) to convert a point into a benefit (S201). In the point conversion instruction, a game in which the benefit can be used and the number of points to be converted into the benefit are designated. Upon accepting the point conversion instruction from the user U, the point management server 30 calculates the amount of benefits to be provided from the number of points designated by the object user U based on the play history of the user U and the conversion rate defined in advance for each game (S202). In addition, the point management server 30 makes the user U confirm the calculated amount of benefits to be provided, and provides the benefits corresponding to the calculated amount to the user U after the confirmation of the user U is obtained (S203: YES) (S204).

Then, upon provision of the benefits to the user U, the point management server 30 generates user information data indicating that the number of benefits possessed by the user U has increased (S205). Thereafter, the point management server 30 transmits the generated user information data to the user terminal 10 of the user U (S206). Note that, in a case where the confirmation from the user U cannot be obtained (S203: NO), the point management server 30 ends the process without any further operation.

When the above-described series of processes described above is completed, the benefit providing process ends. Thereafter, every time the user U performs an operation of converting a point into a benefit, the above-described series of steps is repeated.

The above is an example of the benefit providing process.

[Lottery Process]

Next, the lottery process will be described with reference to FIG. 14.

The lottery process is a process executed in the game management server 40, and refers to a process of performing a lottery in response to a lottery application from the user U and providing an object won as a lottery result to the user U. Here, a case where a lottery is performed by consuming a benefit will be described.

Figure 14:
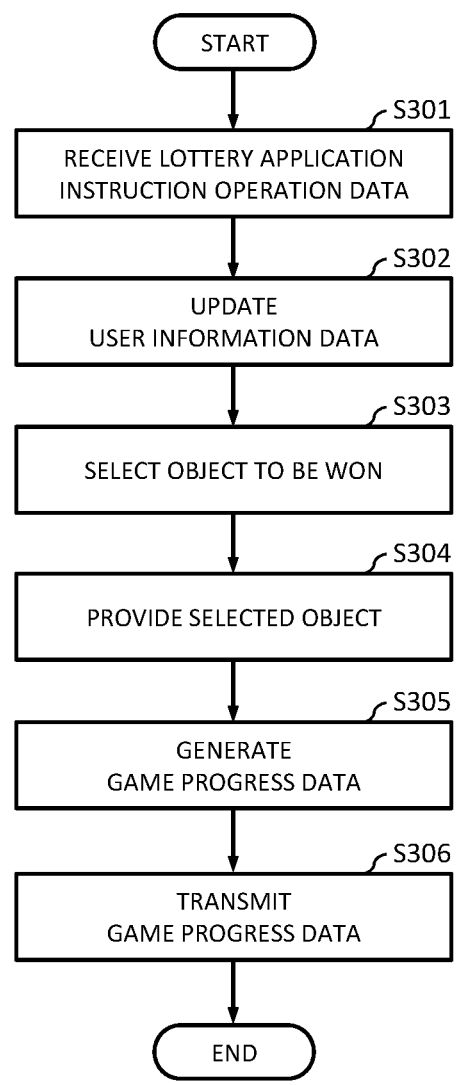
FIG. 14 is a flowchart illustrating a flow of a lottery process.

As illustrated in FIG. 14, upon receiving lottery application instruction operation data from the user terminal 10 and accepting a lottery application from the user U (S301), the game management server 40 updates user information data by subtracting the amount of benefits consumed for performing a lottery (S302). In addition, the game management server 40 selects an object to be won as a lottery result based on the winning probability set for each object from among a plurality of candidate objects (S303), and provides the selected object to the user U (S304).

Then, the game management server 40 generates game progress data notifying the lottery result (S305), and transmits the generated game progress data to the user terminal 10 of the user U (S306).

When the above-described series of processes described above is completed, the lottery process ends. Thereafter, every time the user U applies a lottery during game play, the above-described series of steps is repeated.

The above is an example of the lottery process.

[Specific Game Control Process]

Next, a specific game control process will be described with reference to FIG. 15.

The specific game control process is a process executed in the game management server 40, and refers to a process of controlling a specific game to be performed by a host and a guest who are the users U together to be playable when both the host and the guest consume their benefits.

Figure 15:
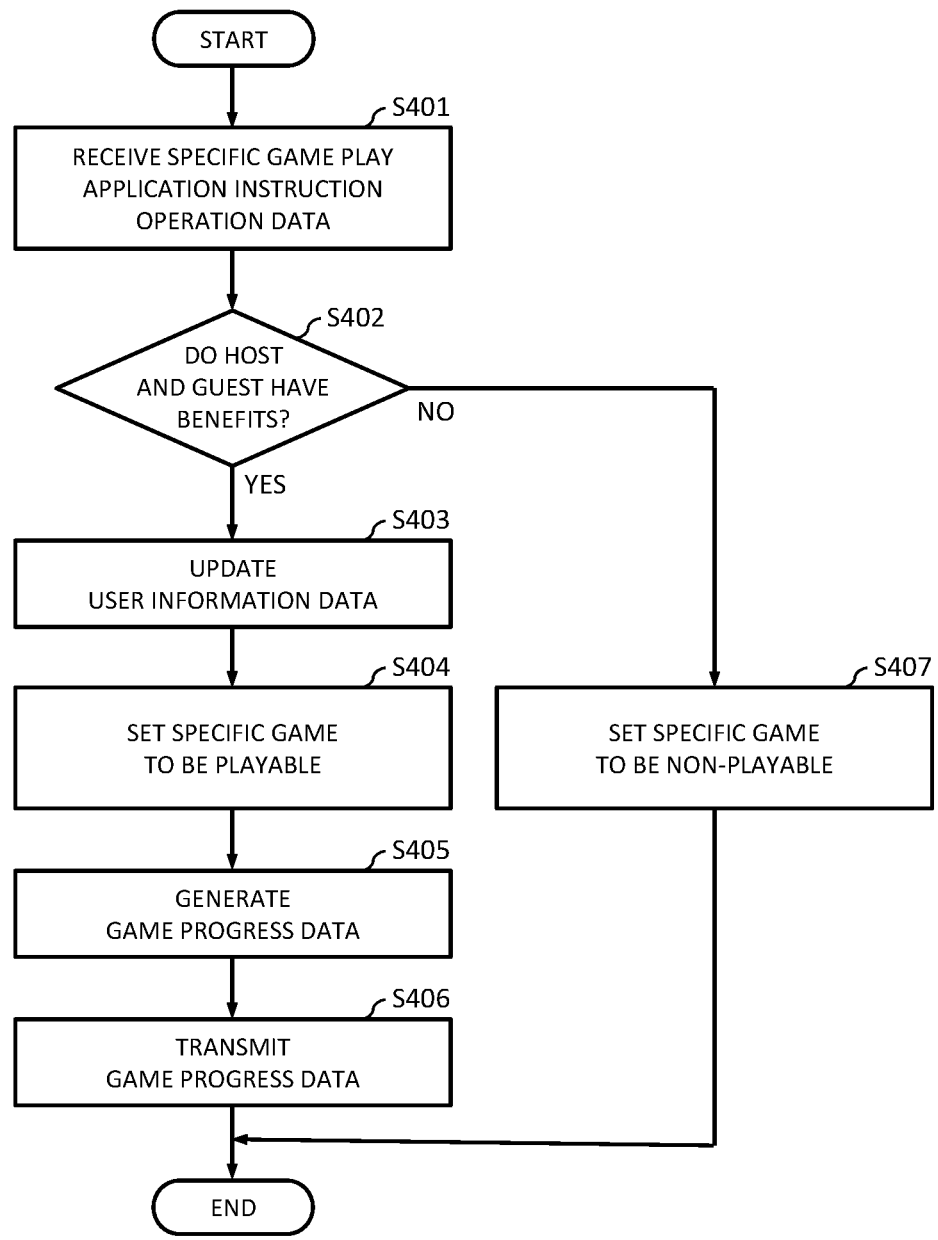
FIG. 15 is a flowchart illustrating a flow of a specific game control process.

As illustrated in FIG. 15, upon receiving specific game play application instruction operation data from the user terminal 10 of a host or a guest, the game management server 40 accepts a play application of a specific game (S401). In this case, the game management server 40 determines whether or not both the host and the guest have a necessary amount of benefits for playing the specific game (S402). When both the host and the guest have benefits (S402: YES), the game management server 40 updates the user information data by subtracting the amount of benefits consumed to play the specific game (S403). Then, the game management server 40 sets the specific game to be playable for both the host and the guest (S404).

Then, the game management server 40 generates game progress data for starting the specific game (S405), and transmits the generated game progress data to the user terminals 10 of the users U (S406).

On the other hand, in a case where either the host or the guest does not have a benefit (S402: NO), the game management server 40 ends the process while holding the specific game in a non-playable state (S407).

When the above-described series of processes described above is completed, the specific game control process ends. Thereafter, every time the user U applies the play of the specific game during the game play, the above-described series of steps is repeated.

The above is an example of the specific game control process.

[Notification Process]

Next, the notification process will be described with reference to FIG. 16.

The notification process is a process executed in the point management server 30, and refers to a process of notifying the user U of information and the like regarding a competition related to betting of a friend user associated with the user U in a game. Specifically, a notification process is performed in a case where points have been acquired by a friend user as a result of betting on a competition, and the user U is notified of information or the like regarding the competition related to the betting of the friend user.

Figure 16:
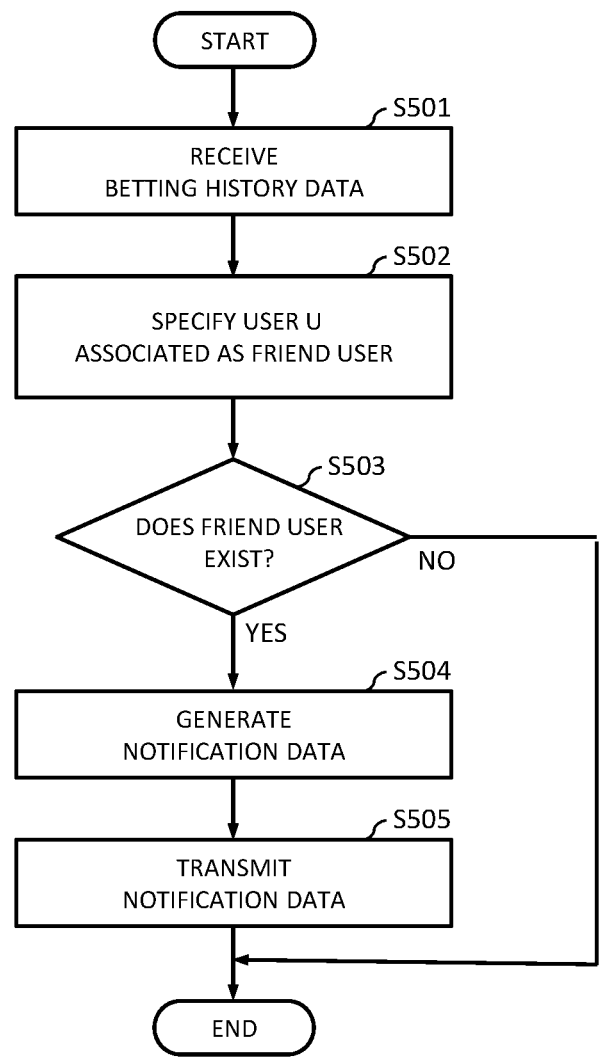
FIG. 16 is a flowchart illustrating a flow of a notification process.

As illustrated in FIG. 16, upon receiving betting history data indicating that certain user U performed betting on a result of a competition from the public competition-side server 50 (S501), the point management server 30 analyzes from the betting history data. At this time, the point management server 30 specifies a user U associated as the friend user with the certain user U based on user information data regarding the user U who performed the betting (S502).

Then, in a case where there is a user U associated as a friend user with the certain user U who performed the betting (S503: YES), the point management server 30 generates notification data based on the user information data regarding the friend user, competition information data, and the like (S504). Thereafter, the point management server 30 transmits the generated notification data to the user terminal 10 of the user U who performed the betting (S505). Note that, in a case where there is no user U associated as a friend user with the certain user U (S503: NO), the point management server 30 ends the process without any further operation.

When the above-described series of processes described above is completed, the notification process ends. Thereafter, every time the above-described user U performs betting on a result of a competition, the above-described series of steps is repeated.

The above is an example of the notification process.

<Other Embodiments>

The present invention is not limited to the above-described embodiment.

In the above-described embodiment, the point management server 30 and the game management server 40 are caused to execute the program of the present invention to function as the information processing apparatus of the present invention. Here, some or all of the functions as the information processing apparatus included in one of the point management server 30 and the game management server 40 may be included in the other server, or may be included in the user terminal 10. For example, a function corresponding to the benefit providing unit 38, the notification unit 39, or the like may be provided in the game management server 40. Furthermore, the user terminal 10 may include a function corresponding to the value providing unit 37, the benefit providing unit 38, the notification unit 39, the control unit 47, the lottery unit 48, or the like.

In the present embodiment, the user information data is stored and held in each of the point management server 30 and the game management server 40. However, the present invention is not limited thereto, and the user information data may be collectively stored in a database server (not shown). Alternatively, all or some of data and information stored in the point management server 30 and the game management server 40 may be stored on the user terminal 10 side.

Furthermore, in the present embodiment, the function of converting a point into a benefit is included in the application program for a game executed in the user terminal 10, but an application program for point conversion may be separately executed in the user terminal 10.

Furthermore, in the present embodiment, the online game using the data communication performed between the user terminal 10 operated by the user U and the game management server 40 is described as an example of the game. However, the type of the game is not particularly limited, and may be an offline game that does not require data communication. Furthermore, the game may be, for example, a social game or the like that can be used only with a web browser and an account for a social networking service (SNS).

Note that, in the present embodiment, the user U can enjoy all the functions of the point management system S for free in principle. However, use of some functions may be charged, and a predetermined fee may be paid to use paid functions. Furthermore, for the user U who has paid a predetermined fee, for example, conditions (advantages) advantageous for the user U, such as an increase in the amount of points to be provided, an increase in the conversion rate, and a higher winning probability of a predetermined object, may be provided. Furthermore, this fee may be charged based on the usage amount, or once the fee has been paid, it may be effective for the user U for a certain period (for example, one month or one year) (subscription).

<Summary>

Main features of the information processing apparatus, the information processing method, and the program according to the present embodiment described above are as follows.

[1] An information processing apparatus according to the present embodiment includes a value providing unit that provides first value to a user who has performed betting on a result of a competition; and a benefit providing unit that provides a benefit usable in a game different from the competition to the user by consuming the first value.

According to the above-described information processing apparatus, it is possible to provide the first value such as a point to a user as an additional value of betting on a result of a competition and provide the benefit usable in the game that can be obtained by consuming and converting the first value. As a result, it is possible to arouse the play motivation for the game and the betting motivation on a result of a competition.

[2] In the information processing apparatus, the value providing unit provides second value usable in the game to the user based on a predetermined condition in the game, the information processing apparatus comprises a lottery unit that performs a lottery for an object usable in the game by consuming the benefit, the first value, or the second value, and the lottery unit sets a winning probability of a predetermined object in the lottery in a case where the benefit or the first value is consumed to be higher than that in a case where the second value is consumed.

Accordingly, in a lottery for an object usable in the game, the winning probability of a predetermined object can be set higher in the case of consuming the benefit or the first value than that in the case of consuming the second value. Therefore, it is possible to further arouse the play motivation for the game and the betting motivation on a result of a competition.

[3] In the information processing apparatus, the value providing unit provides third value usable in the betting to the user based on a result of the lottery.

Accordingly, since the user can obtain the third value usable in betting based on a lottery result, it is possible to further arouse the play motivation for the game and the betting motivation on a result of the competition.

[4] In the information processing apparatus, the value providing unit provides third value usable in the betting to the user based on a payment amount for the game or a consumption amount of a predetermined game medium in the game.

Accordingly, since the user can obtain the third value usable in betting based on the payment amount for the game or the consumption amount of a predetermined game medium in the game, it is possible to further arouse the play motivation for the game and the betting motivation on a result of a competition.

[5] In the information processing apparatus, the value providing unit changes an amount of the first value to be provided based on a consumption amount of the third value usable in the betting, the benefit providing unit changes an amount of the benefit to be provided based on a consumption amount of the first value, and the information processing apparatus further comprises: a first control unit that controls the game to be playable by consuming a predetermined amount of the benefit; and a first notification unit that calculates an amount of the third value necessary for the benefit to satisfy the predetermined amount in a case where an amount of the benefit possessed by the user is less than the predetermined amount and notifies the user of the calculated amount of the third value.

With this, in a case where the amount of the benefit possessed by the user is less than a predetermined amount necessary for playing the game, the user can know the amount of the third value necessary for the benefit to satisfy the predetermined amount. Therefore, it is possible to further arouse the play motivation for the game and the betting motivation on a result of a competition.

[6] In the information processing apparatus, in a case where a sum of the benefit possessed by the user and the benefit to be provided based on the amount of the third value designated by the user is less than the predetermined amount before execution of the betting, the first notification unit calculates an amount of the third value necessary for the sum of the benefits to satisfy the predetermined amount.

With this, in a case where the sum of the possessed benefit and the benefit to be provided based on the amount of the third value designated by the user is less than a predetermined amount necessary for playing the game, the user can know the amount of the third value necessary for the benefit to satisfy the predetermined amount. Therefore, it is possible to further arouse the play motivation for the game and the betting motivation on a result of a competition.

[7] In the information processing apparatus, the first notification unit calculates the necessary amount of the third value based on a difference between the predetermined amount and the amount of the benefit possessed by the user.

As a result, the user can know the necessary amount of the third value based on a difference between the predetermined amount and the amount of the benefit possessed by the user. Therefore, it is possible to further arouse the play motivation for the game and the betting motivation on a result of a competition.

[8] The information processing apparatus further includes a second notification unit that notifies the user of information regarding a game selected based on a play history of the user in the game.

As a result, the user can know the information regarding a game selected based on a play history of the user. Therefore, it is possible to further arouse the play motivation for the game and the betting motivation on a result of a competition.

[9] The information processing apparatus further includes a third notification unit that notifies the user of information regarding a game played by a friend user associated with the user in a case where the friend user has played the game by consuming the first value.

In a case where the friend user is playing the game by betting on a result of a competition, it is possible to notify information regarding the game, that is, to introduce information regarding the game the friend user is playing, and it is easy to create an opportunity to play the game together and interact with the friend user. Therefore, it is possible to further arouse the play motivation for the game and the betting motivation on a result of a competition.

[10] The information processing apparatus includes a fourth notification unit that notifies the user of information regarding a competition related to betting of a friend user associated with the user in a case where the friend user has obtained the first value through the betting on a result of the competition.

As a result, in a case where the friend user of the game performs betting on a result of a competition, it is possible to notify the user of information regarding the competition related to the betting, in other words, introduce the information regarding the competition the friend user is playing to the user, and it becomes easy to create an opportunity to perform not only play of the game but also betting on a result of a competition together and have an interaction. Therefore, it is possible to further arouse the play motivation for the game and the betting motivation on a result of a competition.

[11] The information processing apparatus includes a second control unit that controls a specific game performable by the user and another user together to be playable when both the user and the other user consume their benefits.

As a result, it is possible to play a specific game in a case where both the user and the other user consume their benefits. Therefore, it is possible to further arouse the play motivation for the game and the betting motivation on a result of a competition.

[12] In the information processing apparatus, the benefit providing unit converts at least a part of the first value into the benefit based on a conversion rate corresponding to the game.

As a result, it is possible to convert the first value into the benefit based on the conversion rate according to the game, and it is possible to further arouse the play motivation for the game and the betting motivation on a result of a competition. In particular, it is possible to further arouse the play motivation for the game in which the conversion rate is set to be high. Furthermore, it is possible to further arouse the motivation of a game user of the game in which the conversion rate is set to be high, for betting on a result of a competition.

[13] In the information processing apparatus, the benefit providing unit sets the conversion rate based on an elapsed time from release of a predetermined version of the game.

As a result, it is possible to set the conversion rate according to the elapsed period from release of the predetermined version of the game, and it is possible to further arouse the play motivation for the game and the betting motivation on a result of a competition. In particular, it is possible to further arouse the play motivation for the game that is in a period for which the conversion rate is set to be high (for example, shortly after a certain version is released). Furthermore, it is possible to further arouse the motivation of a game user of the game that is in the period for which the conversion rate is set to be high, for betting on a result of a competition.

[14] In the information processing apparatus, the benefit providing unit sets the conversion rate based on a play history of the user in the game.

As a result, the conversion rate can be set based on the play history of the game, and it is possible to further arouse the play motivation for the game and the betting motivation on a result of a competition. In particular, it is possible to further arouse the motivation of a game user for whom the conversion rate is set to be high, for playing the game and betting on a result of a competition.

Specifically, in a case where the conversion rate of a beginner user is set to be high, it is possible to further arouse the motivation of a game inexperienced person, a game beginner, or the like, for playing the game and betting on a result of a competition. Furthermore, in a case where the conversion rate of a dormant user is set to be high, or in a case where the conversion rate of a heavy user is set to be high, it is possible to further arouse the motivation of such game users to whom the relevant conditions are applicable, for playing the game and betting on a result of a competition.

[15] In the information processing apparatus, the benefit providing unit sets the conversion rate based on a degree of relevance between the game and the competition.

As a result, the conversion rate can be set based on the degree of relevance between a game and a competition, and it is possible to further arouse the play motivation for the game and the betting motivation on a result of a competition. In particular, it is possible to further arouse the play motivation for a game having a high degree of relevance with the competition for which the user has made a bet and the betting motivation on a result of a competition having a high degree of relevance with the game that the user is playing.

[16] In the information processing apparatus, the benefit providing unit sets the conversion rate based on the number of users associated with the game.

As a result, the conversion rate can be set based on the number of users associated with the game, and it is possible to further arouse the play motivation for the game and the betting motivation on a result of a competition. In particular, in a case where the conversion rate is set to be high for a game having a small number of users, it is possible to further arouse the play motivation for the game having the small number of users. Furthermore, it is possible to further arouse the betting motivation of a game user of the game for which the conversion rate is set to be high, for betting on a result of a competition to.

[17] In the information processing apparatus, the value providing unit sets an amount of the first value to be provided to be larger in a case where a betting result is losing than that in a case where the betting result is winning.

In this manner, in a case where the betting result is losing, the first value higher than that in a case where the betting result is winning is provided, so that it is possible to further arouse the play motivation for the game and the betting motivation on a result of a competition. In particular, it is possible to further arouse the motivation of a user whose betting result is losing, for playing the game and betting on a result of a competition.

[18] In the information processing apparatus, the value providing unit changes an amount of the first value to be provided based on an amount of the third value corresponding to a lost bet.

In this manner, in a case where a betting result is losing, the first value is provided based on the amount of money corresponding to the lost bet, so that it is possible to further arouse the play motivation for the game and the betting motivation for a result of a competition. In particular, if the amount of the first value to be provided is increased when the amount of money corresponding to a lost bet is large, it is possible to further arouse the motivation of the user whose bet was lost and experienced a large loss, for playing the game and betting on a result of a competition.

[19] In the information processing apparatus, the value providing unit changes an amount of the first value to be provided based on a difference between a consumption amount of the third value and a payout amount.

In this manner, by changing the amount of the first value to be provided based on the difference between the betting amount of money and the payout amount, it is possible to further arouse the play motivation for the game and the betting motivation on a result of a competition. In particular, if the amount of the first value to be provided is increased with increased difference between the betting amount of money and the payout amount, it is possible to further arouse the motivation of the user whose bet was lost, for playing the game and betting on a result of a competition.

[20] In the information processing apparatus, the value providing unit changes an amount of the first value to be provided based on at least one of a cumulative number of times of betting and a cumulative consumption amount of the third value of the user.

In this manner, by changing the amount of the first value to be provided based on the cumulative number of times of betting or the cumulative betting amount of money of the user, it is possible to further arouse the play motivation for the game and the betting motivation on a result of a competition. In particular, if the amount of the first value to be provided is increased based on the cumulative number of times of betting or the cumulative betting amount of money, it is possible to further arouse the motivation of the user having a large cumulative number of times of betting or the cumulative betting amount of money, for playing the game. In addition, it is possible to further arouse the betting motivation on a result of a competition in order to increase the cumulative number of times of betting or the cumulative betting amount of money for the purpose of earning the first value.

[21] Furthermore, according to an information processing method according to the present embodiment, the method includes providing, by a computer, first value to a user who has performed betting on a result of a competition, and providing, by a computer, a benefit usable in a game different from the competition to the user by consuming the first value.

According to the above-described information processing method, it is possible to provide the first value such as a point to a user as an additional value of betting on a result of a competition and provide the benefit usable in the game that can be obtained by consuming and converting the first value. As a result, it is possible to arouse the play motivation for the game and the betting motivation on a result of a competition.

[22] Furthermore, according to a program according to the present embodiment, the program is executed by a computer, the program causing the computer to provide first value to a user who has performed betting on a result of a competition, and causing the computer to provide a benefit usable in a game different from the competition to the user by consuming the first value.

According to the above-described program, it is possible to provide the first value such as a point to a user as an additional value of betting on a result of a competition and provide the benefit usable in the game that can be obtained by consuming and converting the first value. As a result, it is possible to arouse the play motivation for the game and the betting motivation on a result of a competition.

[23] An information processing apparatus according to the present embodiment is an information processing apparatus including a processor, wherein the processor specifies an object user who has performed betting based on information regarding betting on a result of a competition as stored for each user and provides first value to the object user, and the processor consumes the first value possessed by the object user and provides a benefit usable in a game different from the competition to the object user based on the consumed first value.

According to the above-described information processing apparatus, it is possible to provide the first value such as a point to a user as an additional value of betting on a result of a competition and provide the benefit usable in the game that can be obtained by consuming and converting the first value. As a result, it is possible to arouse the play motivation for the game and the betting motivation on a result of a competition.

DESCRIPTION OF SYMBOLS

10 User terminal
11 Processor
12 Storage device
13 Communication interface
14 Input device
15 Output device
16 Operation specifying unit
17 Terminal-side storage unit
18 Terminal-side generation unit
19 Terminal-side transmission/reception unit
20 Display processing unit
30 Point management server
31 Processor
32 Storage device
33 Communication interface
34 Point server-side storage unit
35 Point server-side transmission/reception unit
36 Point server-side generation unit
37 Value providing unit
38 Benefit providing unit
39 Notification unit
39a First notification unit
39b Second notification unit
39c Third notification unit
39d Fourth notification unit
40 Game management server
41 Processor
42 Storage device
43 Communication interface
44 Game server-side storage unit
45 Game server-side transmission/reception unit
46 Game server-side generation unit
47 Control unit
47a First control unit
47b Second control unit
48 Lottery unit
50 Public competition-side server
51 Processor
52 Storage device
53 Communication interface
54 Public competition server-side storage unit
55 Public competition server-side transmission/reception unit
56 Public competition server-side generation unit
57 Data processing unit
N Network
S Point management system
U User

The invention claimed is:

1. An information processing apparatus comprising a processor, the processor being configured to:
provide a first value to a user who has performed betting on a result of a competition; and
provide a benefit usable in a game different from the competition to the user by consuming the first value, wherein the processor:
changes an amount of the first value to be provided based on a consumption amount of the third value usable in the betting;
changes an amount of the benefit to be provided based on a consumption amount of the first value;
controls the game to be playable by consuming a predetermined amount of the benefit; and
calculates an amount of the third value necessary for the benefit to satisfy the predetermined amount in a case where an amount of the benefit possessed by the user is less than the predetermined amount and notifies the user of the calculated amount of the third value.

2. The information processing apparatus according to claim 1, wherein the processor provides a second value usable in the game to the user based on a predetermined condition in the game, performs a lottery for an object usable in the game by consuming the benefit, the first value, or the second value, and sets a winning probability of a predetermined object in the lottery in a case where the benefit or the first value is consumed to be higher than that in a case where the second value is consumed.

3. The information processing apparatus according to claim 2, wherein the processor provides a third value usable in another betting to the user based on a result of the lottery.

4. The information processing apparatus according claim 1, wherein the processor provides a third value usable in another betting to the user based on a payment amount for the game or a consumption amount of a predetermined game medium in the game.

5. The information processing apparatus according to claim 1, wherein in a case where a sum of the benefit possessed by the user and the benefit to be provided based on the amount of the third value designated by the user is less than the predetermined amount before execution of the betting, the processor calculates an amount of the third value necessary for the sum of the benefits to satisfy the predetermined amount.

6. The information processing apparatus according to claim 1, wherein the processor calculates the necessary amount of the third value based on a difference between the predetermined amount and the amount of the benefit possessed by the user.

7. The information processing apparatus according to claim 1, wherein the processor notifies the user of information regarding the game selected based on a play history of the user in the game.

8. The information processing apparatus according to claim 1, wherein the processor notifies the user of information regarding the game played by a friend user associated with the user in a case where the friend user has played the game by consuming the first value.

9. The information processing apparatus according to claim 1, wherein the processor notifies the user of information regarding a competition relevant to betting of a friend user associated with the user in a case where the friend user has separately performed betting and obtained the first value through the betting on the result of the competition.

10. The information processing apparatus according to claim 1, wherein the processor controls a specific game performable by the user and another user together to be playable when both the user and the other user consume their benefits.

11. An information processing apparatus comprising a processor, the processor being configured to:
provide a first value to a user who has performed betting on a result of a competition;
provide a benefit usable in a game different from the competition to the user by consuming the first value;
convert at least a part of the first value into the benefit based on a conversion rate corresponding to the game; and set the conversion rate based on a degree of relevance between the game and the competition.

12. An information processing apparatus comprising a processor, the processor being configured to:

provide a first value to a user who has performed betting on a result of a competition;

provide a benefit usable in a game different from the competition to the user by consuming the first value; and set an amount of the first value to be provided to be larger in a case where a betting result is losing than that in a case where the betting result is winning.

13. An information processing apparatus comprising a processor, the processor being configured to:

provide a first value to a user who has performed betting on a result of a competition;

provide a benefit usable in a game different from the competition to the user by consuming the first value; and change an amount of the first value to be provided based on an amount of value used in the betting and corresponding to a lost bet.

14. An information processing apparatus comprising a processor, the processor being configured to:

provide a first value to a user who has performed betting on a result of a competition;

provide a benefit usable in a game different from the competition to the user by consuming the first value; and change an amount of the first value to be provided based on a difference between a consumption amount of value used in the betting and a payout amount.

* * * * *